United States Patent
Jiang et al.

(10) Patent No.: US 11,345,043 B2
(45) Date of Patent: May 31, 2022

(54) AXIAL FORCE SENSOR, ROBOT GRIPPER, AND ROBOT HAVING THE SAME

(71) Applicant: Flexiv Ltd., Santa Clara, CA (US)

(72) Inventors: Hao Jiang, Mountain View, CA (US); Shiquan Wang, Foster City, CA (US)

(73) Assignee: Flexiv Ltd., Grand Cayman (KY)

( * ) Notice: Subject to any disclaimer, the term of this patent is extended or adjusted under 35 U.S.C. 154(b) by 410 days.

(21) Appl. No.: 16/456,562

(22) Filed: Jun. 28, 2019

(65) Prior Publication Data

US 2020/0001472 A1    Jan. 2, 2020

Related U.S. Application Data

(60) Provisional application No. 62/693,034, filed on Jul. 2, 2018.

(51) Int. Cl.
| | |
|---|---|
| *G01L 5/00* | (2006.01) |
| *B25J 13/08* | (2006.01) |
| *B25J 15/08* | (2006.01) |
| *B25J 9/16* | (2006.01) |
| *G01L 1/12* | (2006.01) |

(52) U.S. Cl.
CPC ........... *B25J 13/085* (2013.01); *B25J 9/1694* (2013.01); *B25J 15/08* (2013.01); *G01L 1/122* (2013.01); *G01L 5/00* (2013.01); *G01L 5/009* (2013.01)

(58) Field of Classification Search
CPC ........ B25J 13/085; B25J 9/1694; B25J 15/08; G01L 1/122; G01L 5/00; G01L 5/009
See application file for complete search history.

(56) References Cited

U.S. PATENT DOCUMENTS

| | | |
|---|---|---|
| 3,705,530 A | 12/1972 | White |
| 5,092,645 A | 3/1992 | Okada |
| 2005/0056100 A1 | 3/2005 | Yuan et al. |
| 2014/0045600 A1 | 2/2014 | Zhu et al. |
| 2017/0336278 A1* | 11/2017 | Mol ...................... F16C 19/522 |
| 2018/0217015 A1* | 8/2018 | Baker .................. F04B 49/065 |
| 2018/0283447 A1* | 10/2018 | Heim .................... G01L 5/0019 |
| 2019/0113407 A1* | 4/2019 | Okada .................... G01L 5/166 |

OTHER PUBLICATIONS

International Search Report for App. No. PCT/US19/40060 dated Jul. 1, 2019 (8 pages).
International Search Report and Written Opinion for App. No. PCT/US2019/040060 dated Jan. 5, 2021 (6 pages).

* cited by examiner

*Primary Examiner* — Max H Noori
(74) *Attorney, Agent, or Firm* — K&L Gates LLP

(57) ABSTRACT

An axial force sensor, a robot gripper and a robot are provided. The axial force sensor includes a sensing diaphragm and at least two signal pairs. The sensing diaphragm includes an inner ring, an outer ring and a connecting element connected between the inner ring and the outer ring. The connecting element is more compliant in a direction of the axial force to be detected than in other loading directions. Each signal pair includes a signal emitter and a signal receiver. The signal emitter is coupled to one of the inner ring and the outer ring. The signal receiver is coupled to the other of the inner ring and the outer ring.

30 Claims, 9 Drawing Sheets

AXIAL FORCE SENSOR, ROBOT GRIPPER, AND ROBOT HAVING THE SAME

CROSS-REFERENCE TO RELATED APPLICATIONS

The present application claims the benefit of priority under 35 U.S.C § 119(e) to U.S. Provisional Patent Application Ser. No. 62/693,034, entitled "LOW CROSSTALK AXIAL FORCE SENSOR" and filed on Jul. 2, 2018, the disclosure of which is herein incorporated by reference in their entirety.

TECHNICAL FIELD

The present disclosure generally relates to sensor structure and technology, and in particular to an axial force sensor, a robot gripper, and a robot having the axial force sensor.

BACKGROUND

Single-axis load cells are widely used in automation industries as well as research laboratories. Existing single-axis load cells commonly measure deflections using strain gauges, which require a sophisticated sensing structure. The sensors used can be sensitive to manufacturing tolerances, temperature changes, and impact loads, and require recalibration frequently. Multiple strain gauges are typically installed exactly opposite one another in the sensing structure to compensate for off-axis loads. The multiple strain gauges can be susceptible to assembling errors.

SUMMARY

Accordingly, the present disclosure aims to provide an axial force sensor, a robot gripper, and a robot having the axial force sensor.

To solve the above-mentioned problem, a technical scheme adopted by the present disclosure is to provide an axial force sensor. The axial force sensor may include a sensing diaphragm and at least two signal pairs. The sensing diaphragm includes an inner ring, an outer ring, and a connecting element connected between the inner ring and the outer ring. The connecting element is more compliant in a direction of the axial force to be detected than in other loading directions. Each signal pair includes a signal emitter and a signal receiver. The signal emitter is coupled to one of the inner ring and the outer ring. The signal receiver is coupled to the other of the inner ring and the outer ring.

To solve the above-mentioned problem, another technical scheme adopted by the present disclosure is to provide a robot gripper. The robot gripper includes a catching mechanism and an axial force sensor. The axial force sensor may be utilized to measure a force acting on the catching mechanism. The axial force sensor may include a sensing diaphragm and at least two signal pairs. The sensing diaphragm includes an inner ring, an outer ring, and a connecting element connected between the inner ring and the outer ring. The connecting element is more compliant in a direction of the axial force to be detected than in other loading directions. Each signal pair includes a signal emitter and a signal receiver. The signal emitter is coupled to one of the inner ring and the outer ring. The signal receiver is coupled to the other of the inner ring and the outer ring.

To solve the above-mentioned problem, another technical scheme adopted by the present disclosure is to provide a robot having at least one axial force sensor. The axial force sensor may include a sensing diaphragm and at least two signal pairs. The sensing diaphragm includes an inner ring, an outer ring, and a connecting element connected between the inner ring and the outer ring. The connecting element is more compliant in a direction of the axial force to be detected than in other loading directions. Each signal pair includes a signal emitter and a signal receiver. The signal emitter is coupled to one of the inner ring and the outer ring. The signal receiver is coupled to the other of the inner ring and the outer ring.

According to the present disclosure, the axial force sensor may include multiple pairs of signal emitters and signal receivers. These signal emitters and signal receivers may be used for off-axis load cancelation and temperature compensation. Thus, the axial force sensor may measure the axial force acting thereon more precisely.

BRIEF DESCRIPTION OF THE DRAWINGS

In order to clearly explain the technical solutions in the embodiments of the present disclosure, the drawings used in the description of the embodiments will be briefly described below. The drawings in the following description are merely exemplary embodiments of the present disclosure. For those of ordinary skill in the art, other embodiments may also be derived based on these drawings without any creative work.

DETAILED DESCRIPTION

The disclosure will now be described in detail with reference to the accompanying drawings and examples. The described embodiments are merely exemplary and represent a subset of the embodiments of the present disclosure. One skilled in the art may recognize additional embodiments based on the embodiments of the present disclosure without creative efforts and all such embodiments fall within the scope of the present disclosure.

Figure 1:
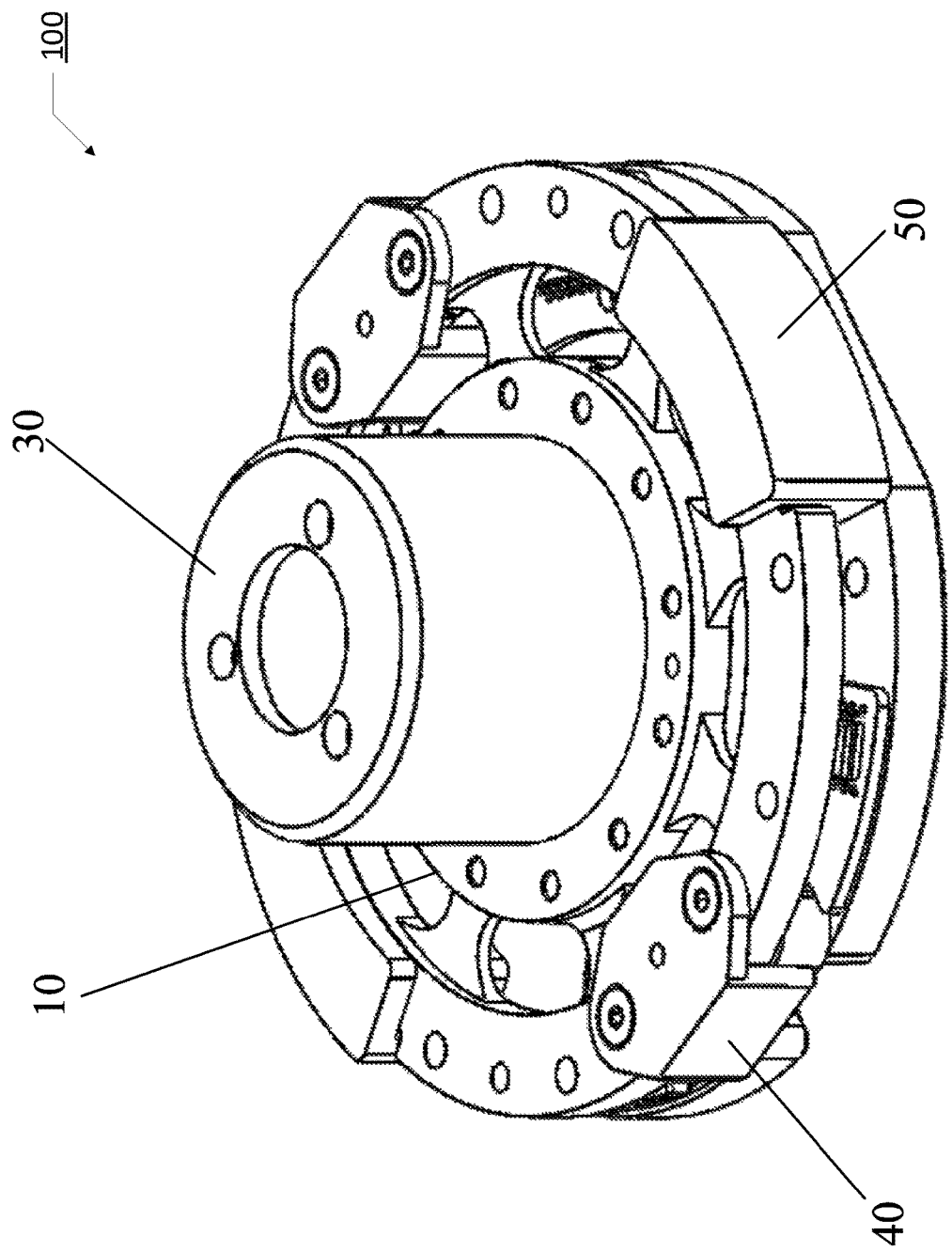
FIG. 1 is a schematic diagram of an axial force sensor according to an embodiment of the present disclosure.
Figure 2:
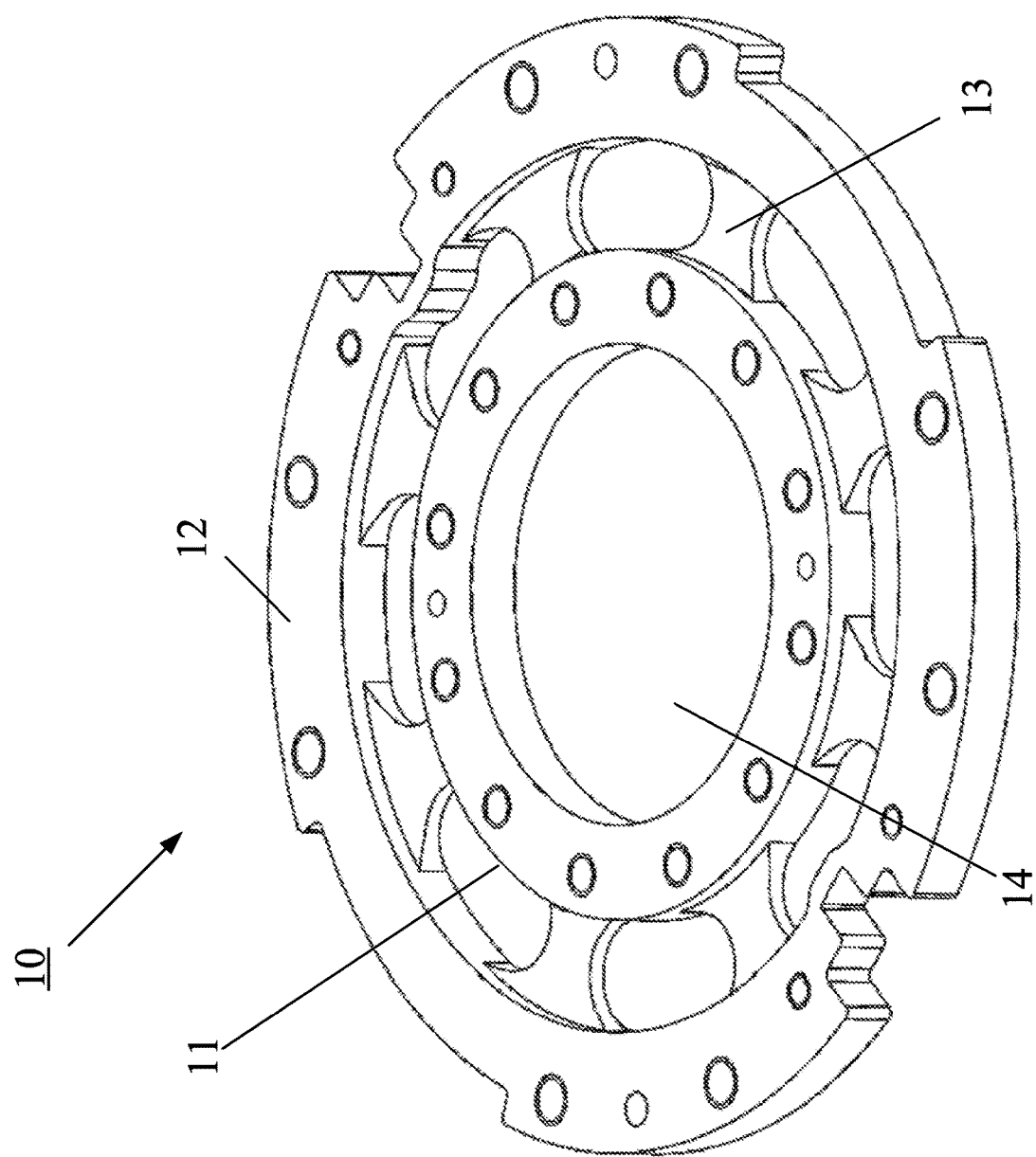
FIG. 2 is a schematic diagram of a sensing diaphragm of an axial force sensor according to an embodiment of the present disclosure.

Referring to FIG. 1, an axial force sensor 100 is illustrated according to certain embodiments of the present disclosure. The axial force sensor 100 may include a sensing diaphragm 10, a holding structure 30, a shielding structure 40, and a hard stop 50. As shown in FIG. 2, the sensing diaphragm 10 may include an inner ring 11, an outer ring 12, a connecting element 13, and a center hole 14. The connecting element 13 may be connected between the inner ring 11 and the outer ring 12. In certain embodiments, the sensing diaphragm 10 may be made of one or more highly robust materials, such as aluminum alloy, titanium alloy, and stainless-steel alloy. The connecting element 13 is more compliant in a direction of the axial force to be detected than in other loading directions. For example, the connecting element 13 may be moderately compliant in the axial direction of the sensing diaphragm 10 but considerably stiff in other loading directions (e.g., stiff against both forces and moments in other loading directions). Therefore, forces and moments in directions other than the force in the axial direction cannot significantly deflect the structure to change the sensor output.

Figure 3:
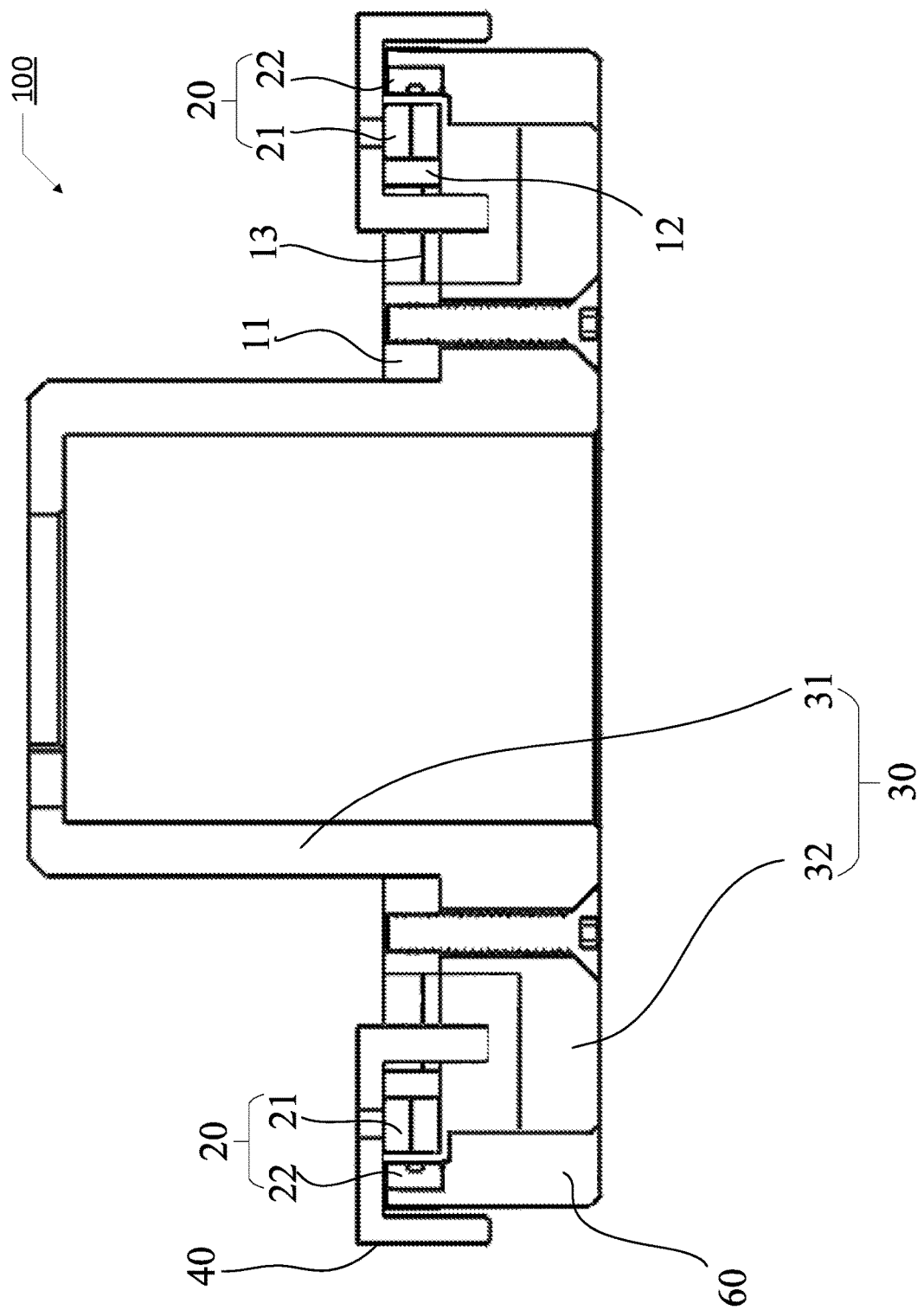
FIG. 3 is a cross-sectional view of an axial force sensor showing an exemplary structure of a shielding structure according to an embodiment of the present disclosure.
Figure 4:
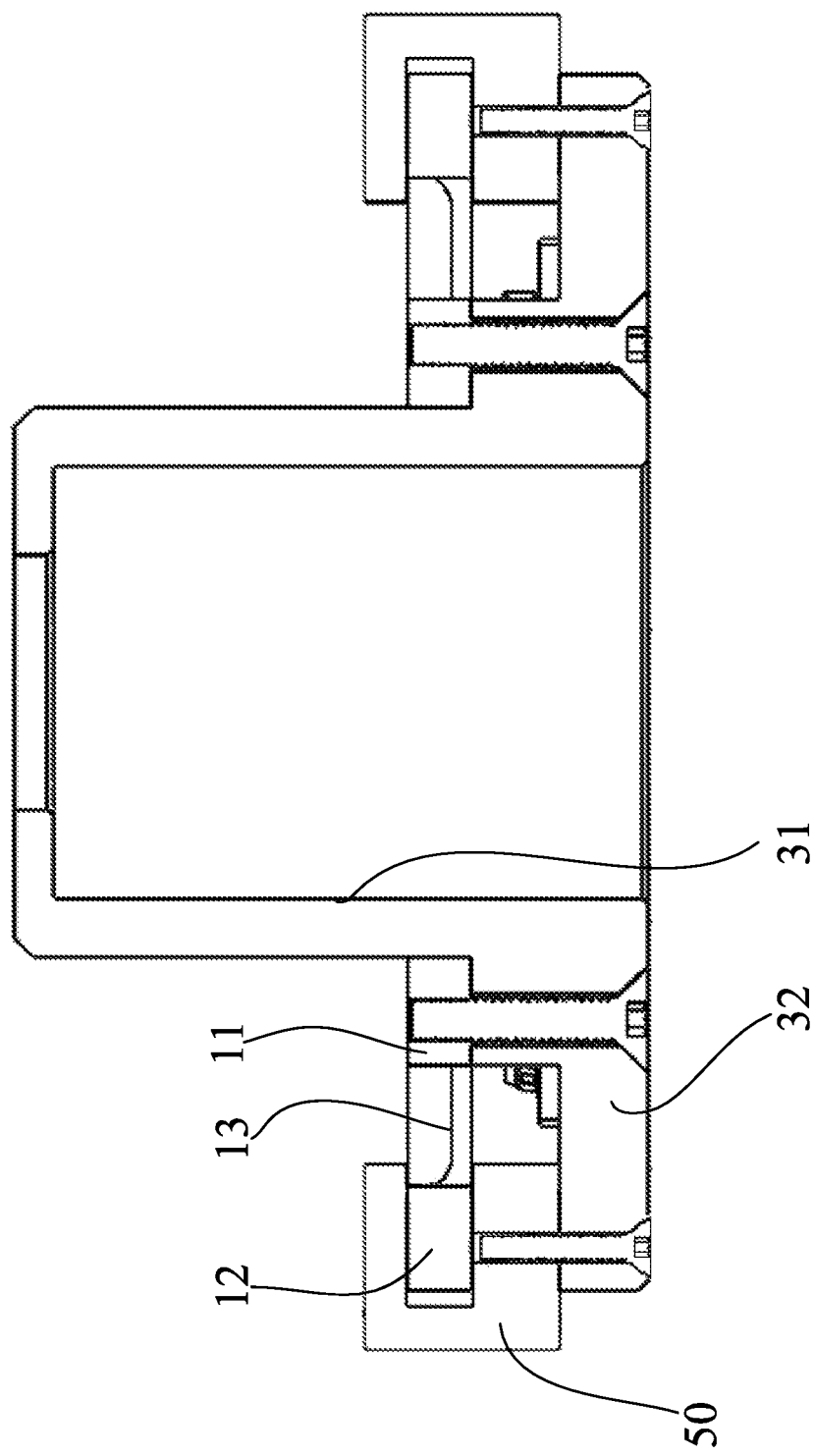
FIG. 4 is a section view of an axial force sensor showing an exemplary structure of a hard stop according to an embodiment of the present disclosure.

FIG. 3 illustrates an example cross-sectional view of an axial force sensor 100 showing a signal pair 20. Each signal pair 20 may include a signal emitter 21 and a signal receiver 22. The signal emitter 21 and the signal receiver 22 may be connected to different parts of the sensing diaphragm 10. That is, in some examples, if the signal emitter 21 is coupled to the inner ring 11 of the sensing diaphragm 10, the signal receiver 22 may be coupled to the outer ring 12 of the sensing diaphragm 10. In other examples, if the signal emitter 21 is coupled to the outer ring 12 of the sensing diaphragm 10, the signal receiver 22 may be coupled to the inner ring 11 of the sensing diaphragm 10. When an axial load is applied to the outer ring 12 (or the inner ring 11) of the sensing diaphragm 10, the outer ring 12 deflects from the inner ring 11, which changes the readings of the signal receiver 22.

In some embodiments, the axial force sensor 100 may include only two signal pairs 20. The two signal pairs 20 may be oppositely arranged along a circumferential direction of the sensing diaphragm 10. When an axial load is applied to the sensing diaphragm 10, the two signal pairs 20 may have opposite trends of signal changes, and thus the total force can be derived by subtracting one from the other and then being divided by two (e.g., calculating a differential output). When an off-axis load, for example, a bending moment, is applied to the sensing diaphragm 10, the two signal pairs 20 may share the same trend of signal changes, and thus by subtracting one from the other, the deflection caused by this load may be canceled. In another example, signal changes caused by temperature shifts make the two signal pairs change in the same trend, and thus by subtracting one from the other, the temperature shifts can also be suppressed. Most non-resistive sensing methods are not sensitive to temperature changes, and thus even without perfect cancelation, temperature changes have little effect on the sensor.

In various examples of the present disclosure, more pairs (e.g., 3, 4, or more) of signal emitters 21 and receivers 22 can also be utilized. In such examples, the use of multiple pairs of signal emitters 21 and signal receivers 22 may enable the axial force sensor 100 to measure the axial force acting thereon more precisely by enabling more precise off-axis load cancellation and temperature compensation. In some examples, the signal emitter 21 and/or the signal receiver 22 may be inductive, capacitive, resistive, optical, or may use other signaling modalities. In one embodiment, the signal emitter 21 may be a magnet and the signal receiver 22 may correspondingly be a hall effect sensor.

A hall effect sensor may work as follows. When a hall effect sensor detects the magnetic field strength perpendicular to the magnetization axis (i.e. the Y axis in FIG. 5) and is capable of moving along the magnetization axis of a magnet (i.e. the Z axis out of and into the page in FIG. 5), the relationship between the displacement of the sensor and the magnetic field strength detected by the sensor is substantially linear. When a hall effect sensor detects the magnetic field strength perpendicular to the magnetization axis (i.e. the Y axis in FIG. 5) and is capable of moving perpendicular to the magnetization axis of a magnet (i.e. the Y axis in FIG. 5), the relationship between the detected magnetic field strength and the displacement of the sensor is less linear and can be modeled with non-linear functions, e.g., polynomial functions.

Further, when a hall effect sensor detects the magnetic field strength perpendicular to the magnetization axis (i.e. the Y axis in FIG. 5) and is capable of moving in a secondary perpendicular direction to the magnetization axis of a magnet (i.e. the X axis in FIG. 5), the detected magnetic field strength does not change. Thus, in aspects of the present disclosure in which the signal emitter 21 is a magnet and the signal receiver 22 is a hall effect sensor, by properly arranging the signal emitter 21 and the signal receiver 22 and measuring the magnetic field strength detected by the signal receiver 22, the displacement of the outer ring 12 with respect to the inner ring 11 in the axial direction of the axial force sensor may be derived. Moreover, the relationship between this displacement and the axial force acting on the axial force sensor 100 may be acquired (e.g., by modeling the axial force sensor 100 or by testing the prototype of the axial force sensor 100). Therefore, the axial force acting on the axial force sensor 100 may be obtained based on the readings of the signal receivers 22 of the signal pairs 20.

Figure 5:
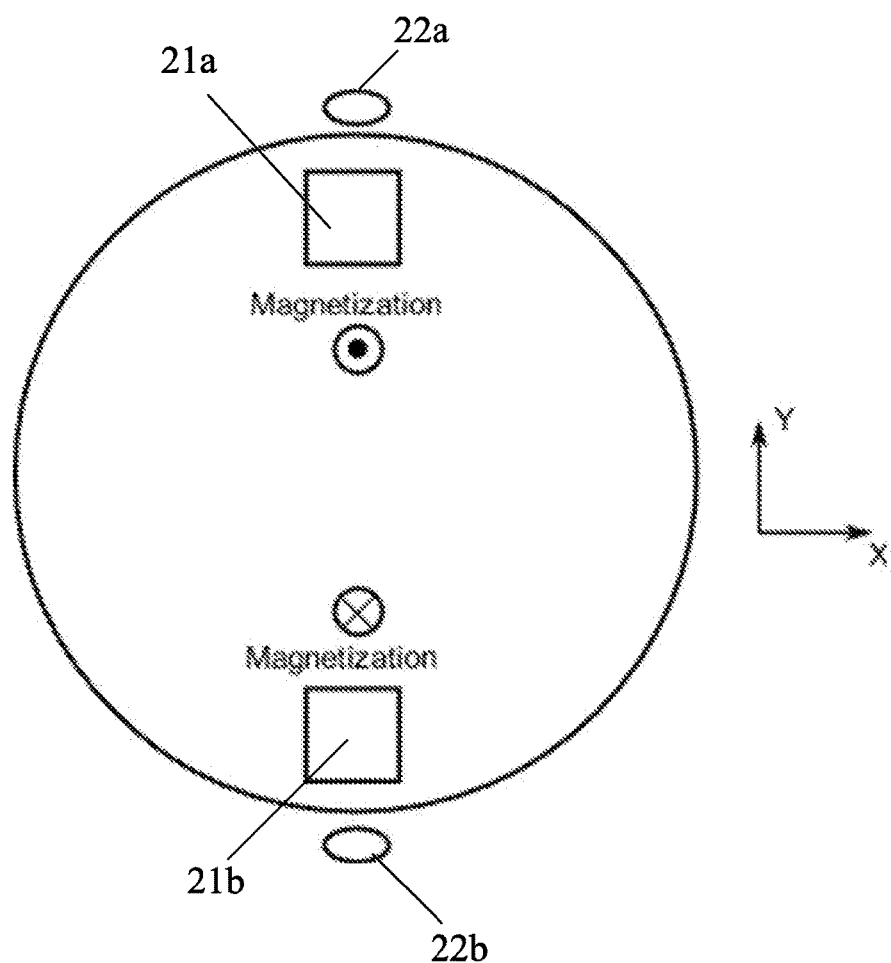
FIGS. 5 and 6 show an exemplary arrangement of two signal pairs installed on an axial force sensor according to embodiments of the present disclosure.

Referring to FIG. 5, in some embodiments, the magnetization direction of the magnet 21a (i.e., signal emitter 21a) may be opposite to the magnetization direction of the magnet 21b (i.e., signal emitter 21b). Moreover, the magnetization directions of the magnets 21a and 21b may both be substantially perpendicular to the extending direction of the sensing diaphragm 10. That is, the magnetization directions of the magnets 21a and 21b may be parallel to the axial direction of the axial force sensor 100.

Figure 6:
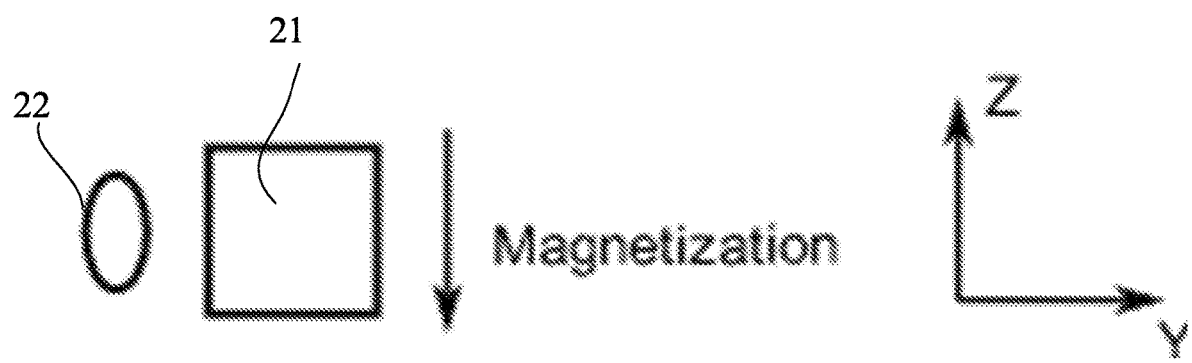

As shown in FIGS. 5 and 6, the hall effect sensors 22a and 22b (i.e. signal receivers 22a and 22b) may be spaced from the corresponding magnets 21a and 21b in the radial direction of the sensing diaphragm 10. In this way, when axial force is applied on the axial force sensor 100, the hall effect sensors 22a and 22b may move in the axial direction of the axial force sensor 100 with respect to the magnets 21a and 21b. Thus, the relationship between the displacement of the hall effect sensors 22a and 22b and the detected magnetic field strength may be substantially linear, which may facilitate the modeling of the structure and the calculation of the axial force. In other embodiments, the two signal pairs 20 may be arranged to have the same trend of signal changes when the axial load is applied on the axial force sensor 100. In this situation, the above-described subtraction method may no longer be applicable, and the outputs of the two signal pairs 20 may be processed differently, for example, by applying a polynomial fit.

Figure 7:
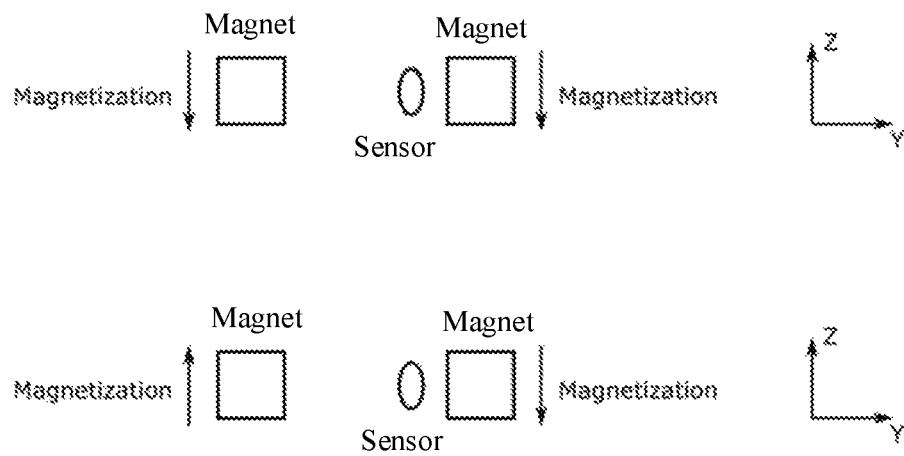
FIGS. 7 to 9 illustrate several exemplary configurations of the signal pairs in an axial force senor according to embodiments of the present disclosure.
Figure 8:
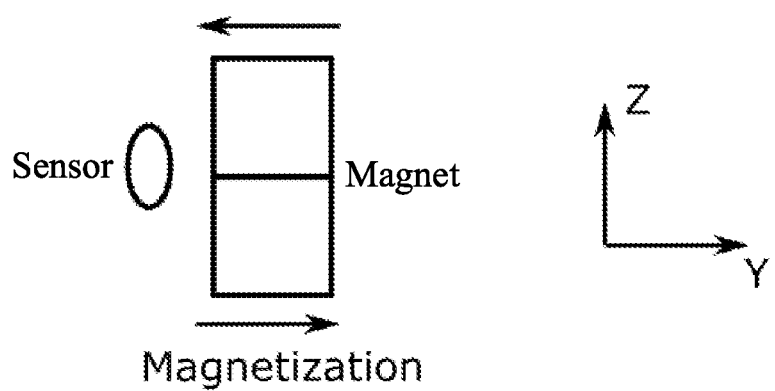
Figure 9:
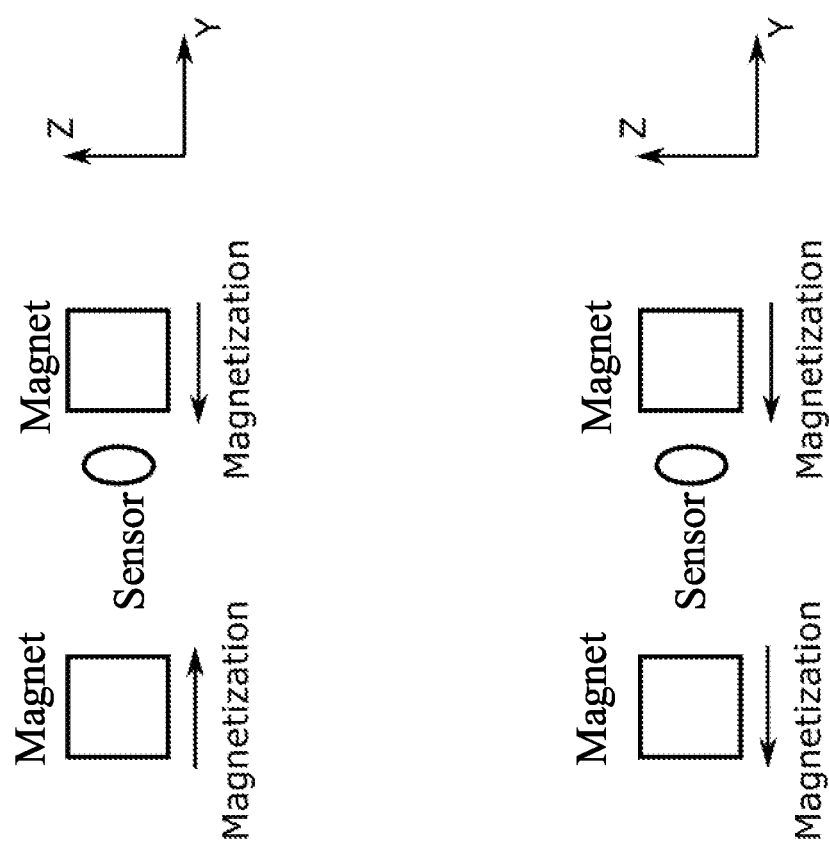

It should be appreciated that the arrangement of the signal pairs 20 shown in FIGS. 5 and 6 is merely illustrative and the signal pairs 20 may be arranged in other configurations. For example, FIGS. 7-9 show several possible configurations of each of the signal pairs 20 of the axial force sensor 100, where the Z direction represents the axial direction of the axial force sensor 100 and the Y direction represents the radial direction of the axial force sensor 100. In some of these configurations, the relationship between the axial displacement of the hall effect sensor (i.e., the signal receiver 22) with respect to the corresponding magnet (i.e., the signal emitter 21) and the detected magnetic field strength may not be linear. However, as long as the relative axial displacement of the hall effect sensor may significantly influence the value of the detected magnetic field strength, it can be utilized to calculate the axial force applied on the axial force sensor 100.

Referring to FIGS. 1 to 4, the holding structure 30 of the axial force sensor 100 may include a center shaft 31 and a supporting plate 32. The holding structure 30 may be made from rigid material in some aspects. For example, the holding structure 30 may be made from the same material as the sensing diaphragm 10. The inner ring 11 of the sensing diaphragm 10 may define a center hole 14. The center shaft 31 may pass through the center hole 14 and, in some examples, may be coupled to the inner ring 11. The supporting plate 32 may be connected to the center shaft 31 and may extend substantially parallel to the sensing diaphragm 10.

In some aspects, the holding structure 30 and the sensing diaphragm 10 may be separate components. In other aspects, the holding structure 30 and the sensing diaphragm may be manufactured as one single component. In some examples, the holding structure 30 may provide more space for installing the components of the axial force sensor 100, and may facilitate the connection between the axial force sensor 100 and other external components. For example, the axial force sensor 100 may be utilized in a robot actuator, and the holding structure 30 may be connected to a driven end of a motor assembly or to an output end (e.g., output flange) of the actuator.

In some embodiments, as shown in FIG. 3, the signal emitter 21 may be installed on the outer ring 12 while the signal receiver 22 is installed on the supporting plate 32 and aligned with the signal emitter 21 in either the axial direction or the radial direction of the sensing diaphragm 10. In such embodiments, since the holding structure 30 is coupled to the inner ring 11 of the sensing diaphragm 10, the signal receiver 22 is also coupled to the inner ring 11 indirectly. In other embodiments, the signal receiver 22 may be installed on the outer ring 12 while the signal emitter 21 is installed on the supporting plate 32 and aligned with the signal receiver 22 in either the axial direction or the radial direction of the sensing diaphragm 10. In such other embodiments, the signal receiver 22 is coupled to the outer ring 12 while the signal emitter 21 is coupled to the inner ring 11.

In some embodiments, the axial force sensor 100 may further include a shielding structure 40. In some aspects, the shielding structure 40 may be installed on the supporting plate 32 and located corresponding to the signal pairs 20 in the circumferential direction of the sensing diaphragm 10. The shielding structure 40 may enclose the signal pairs 20 to protect the signal pairs 20 from signal disruption and/or interference. In some examples, the structure and material of the shielding structure 40 may be based on the type of the signal pairs 20. For example, if magnetic signals are used in the signal pairs 20, the shielding structure 40 may be made from high magnetic permeability material such as supermalloy, super mumetal alloys, sanbold, permalloy, carbon steel, martensite steel, etc. If optical signals are used in the signal pairs 20, the shielding structure 40 may be made from light blocking material such as opaque plastics, metals or rubber. It should be understood, in other embodiments, the shielding structure 40 may alternatively be installed on the sensing diaphragm 10, which is not limited in the present disclosure.

In some embodiments, the axial force sensor 100 may further include a hard stop 50. The hard stop 50 may be installed on the supporting plate 32 and may enclose the outer ring 12 of the sensing diaphragm 10. The hard stop 50 may have, for example, a C-shaped configuration. In other examples, the hard stop 50 may take any number of different suitable configurations. In some aspects, there may exist clearances (not shown) between the hard stop 50 and the outer ring 12 on both the upper and lowers sides, and the hard stop 50 may be utilized to prevent over deflection of the outer ring 12. When excessive deflection occurs with overload, the rigid hard stop 50 may prevent further deflection of the outer ring 12, thus protecting the sensing diaphragm 10 from yielding and fatigue. In some examples, the axial force sensor 100 may have only one hard stop 50 as illustrated figures. In other examples, the axial force sensor 100 may have more than one hard stop 50.

Figure 10:
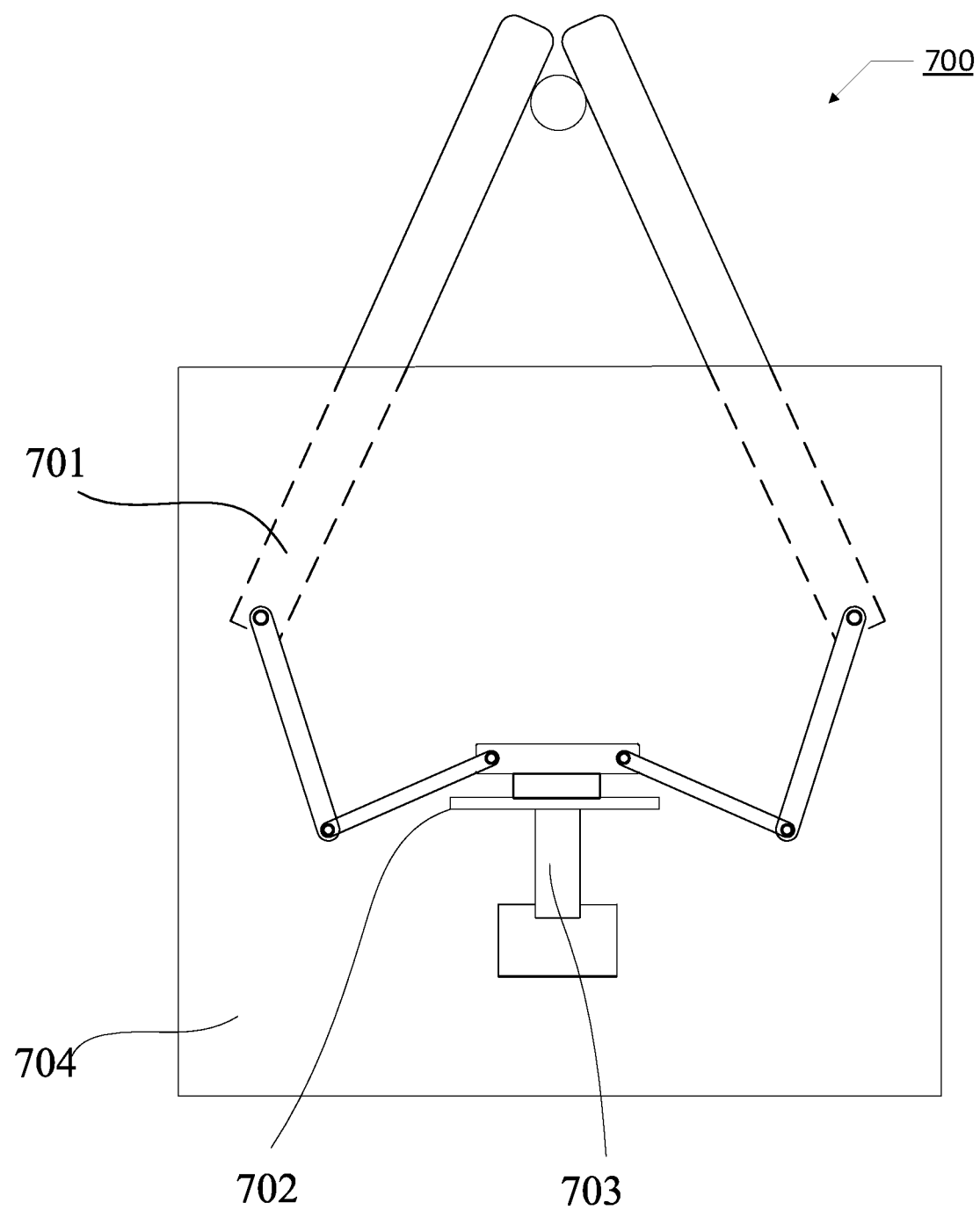
FIG. 10 is a schematic diagram of a gripper according to an embodiment of the present disclosure.

The present disclosure also provides for a robot gripper. As shown in FIG. 10, the robot gripper 700 may include a catching mechanism 701 and an axial force sensor 702. The axial force sensor 702 may be utilized to measure the force acting on the catching mechanism 701. The structure and function of the axial force sensor 702 may be similar to any axial force sensor of the embodiments described above (e.g., the example axial force sensor 100). The robot gripper 700 may further include a driving assembly 703 and a shell 704. The driving assembly 703 may be coupled to the axial force sensor 702 and configured to drive the catching mechanism 701. The catching mechanism 701 and the driving assembly 703 may be installed on the shell 704 in any suitable way. Those of ordinary skill in the art should understand, the structure of the robot gripper 700 shown in FIG. 10 is merely illustrative and is not intended to limit the scope of the present disclosure. The axial force sensor 702 may be used with a robot gripper of any suitable structure and construction in other examples of the present disclosure.

Figure 11:
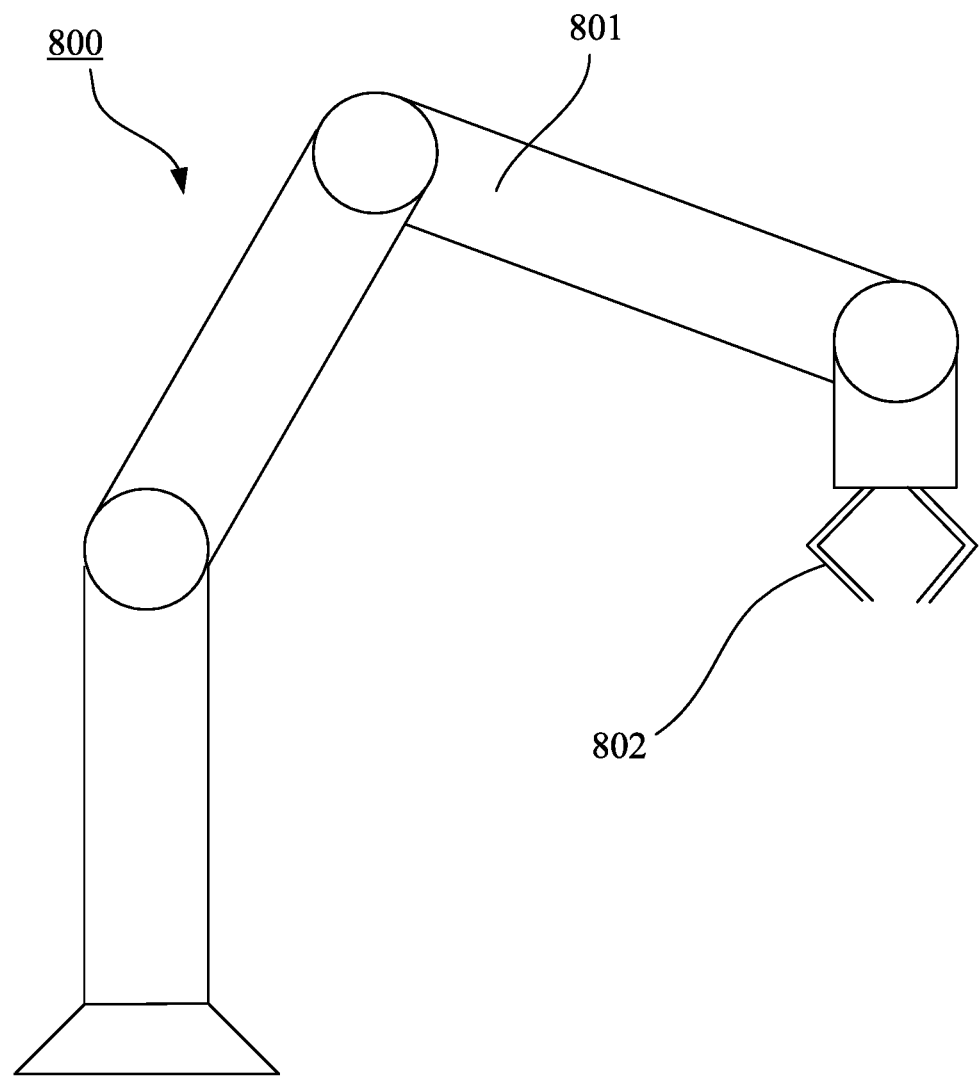
FIG. 11 is a schematic diagram of a robot according to an embodiment of the present disclosure.

The present disclosure also provides for a robot with at least one axial force sensor. For example, as shown in FIG. 11, the robot 800 may include multiple robotic arms 801 and an end effector 802. The end effector 802 may be a gripper, in which an axial force sensor (not shown) may be installed for measuring the gripping force of the gripper. For example, the end effector 802 may be the robot gripper 700 that utilizes the axial force sensor 702 as described above. In other examples, the end effector 802 may be any other suitable gripper that utilizes any suitable axial force sensor as described in the present disclosure. Furthermore, the robot 800 may include other force sensors (e.g., in the actuators) based on actual design requirements. The structure of the at least one axial force sensor may be similar to any axial force sensor of the embodiments described above.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:
1. An axial force sensor, comprising:
 a sensing diaphragm comprising:
  an inner ring;
  an outer ring; and a connecting element connected between the inner ring and the outer ring, wherein the connecting element is more compliant in a direction of the axial force to be detected than in other loading directions; and at least two signal pairs comprising a first signal pair and a second signal pair oppositely arranged along a circumferential direction of the sensing diaphragm, each of the at least two signal pairs comprising:

a signal emitter coupled to one of the inner ring and the outer ring, wherein the signal emitter is a magnet; and a signal receiver coupled to the other of the inner ring and the outer ring, wherein the signal receiver is a hall effect sensor, wherein:

a magnetization direction of the magnet of the first signal pair is opposite to a magnetization direction of the magnet of the second signal pair;

both the magnetization direction of the magnet of the first signal pair and the magnetization direction of the magnet of the second signal pair are substantially perpendicular to an extending direction of the sensing diaphragm; and the hall effect sensor of each of the first signal pair and the second signal pair is spaced from a corresponding magnet in a radial direction of the sensing diaphragm.

2. The axial force sensor of claim 1, further comprising a holding structure, wherein the inner ring defines a center hole, the holding structure comprises:
a center shaft passing through the center hole and coupled to the inner ring; and
a supporting plate connected to the center shaft and extending parallel to the sensing diaphragm.

3. The axial force sensor of claim 2, further comprising:
a shielding structure installed on the supporting plate and located corresponding to the at least two signal pairs in a circumferential direction of the sensing diaphragm, wherein the shielding structure encloses the at least two signal pairs to protect the at least two signal pairs from signal disturbing.

4. The axial force sensor of claim 2, further comprising a hard stop installed on the supporting plate and enclosing the outer ring, wherein there exist clearances between the hard stop and the outer ring on both upper and lower sides, and the hard stop is configured to prevent over deflection of the outer ring.

5. The axial force sensor of claim 2, wherein the signal emitter is installed on the outer ring while the signal receiver is installed on the supporting plate and aligned with the signal emitter in either an axial direction or a radial direction of the sensing diaphragm.

6. The axial force sensor of claim 2, wherein the signal receiver is installed on the outer ring while the signal emitter is installed on the supporting plate and aligned with the signal receiver in either an axial direction or a radial direction of the sensing diaphragm.

7. A robot gripper comprising a catching mechanism and an axial force sensor, the axial force sensor being configured to measure a force acting on the catching mechanism, wherein the axial force sensor comprises:
a sensing diaphragm comprising:
an inner ring;
an outer ring; and
a connecting element connected between the inner ring and the outer ring, wherein the connecting element is more compliant in a direction of the axial force to be detected than in other loading directions; and at least two signal pairs comprising a first signal pair and a second signal pair oppositely arranged along a circumferential direction of the sensing diaphragm, each of the at least two signal pairs comprising:

a signal emitter coupled to one of the inner ring and the outer ring, wherein the signal emitter is a magnet; and a signal receiver coupled to the other of the inner ring and the outer ring, wherein the signal receiver is a hall effect sensor, wherein:

a magnetization direction of the magnet of the first signal pair is opposite to a magnetization direction of the magnet of the second signal pair;

both the magnetization direction of the magnet of the first signal pair and the magnetization direction of the magnet of the second signal pair are substantially perpendicular to an extending direction of the sensing diaphragm; and the hall effect sensor of each of the first signal pair and the second signal pair is spaced from a corresponding magnet in a radial direction of the sensing diaphragm.

8. The robot gripper of claim 7, wherein the axial force sensor further comprises a holding structure, the inner ring defines a center hole, the holding structure comprises:
a center shaft passing through the center hole and coupled to the inner ring; and
a supporting plate connected to the center shaft and extending parallel to the sensing diaphragm.

9. The robot gripper of claim 8, wherein the axial force sensor further comprises:
a shielding structure installed on the supporting plate and located corresponding to the at least two signal pairs in a circumferential direction of the sensing diaphragm, wherein the shielding structure encloses the at least two signal pairs to protect the at least two signal pairs from signal disturbing.

10. The robot gripper of claim 8, wherein the axial force sensor further comprises:
a hard stop installed on the supporting plate and enclosing the outer ring, wherein there exist clearances between the hard stop and the outer ring on both upper and lower sides, and the hard stop is configured to prevent over deflection of the outer ring.

11. A robot with at least one axial force sensor, each of the at least one axial force sensor comprising:
a sensing diaphragm comprising:
an inner ring;
an outer ring; and
a connecting element connected between the inner ring and the outer ring, wherein the connecting element is more compliant in a direction of the axial force to be detected than in other loading directions; and at least two signal pairs comprising a first signal pair and a second signal pair oppositely arranged along a circumferential direction of the sensing diaphragm, each of the at least two signal pairs comprising:

a signal emitter coupled to one of the inner ring and the outer ring, wherein the signal emitter is a magnet; and a signal receiver coupled to the other of the inner ring and the outer ring, wherein the signal receiver is a hall effect sensor, wherein:

a magnetization direction of the magnet of the first signal pair is opposite to a magnetization direction of the magnet of the second signal pair;

both the magnetization direction of the magnet of the first signal pair and the magnetization direction of the magnet of the second signal pair are substantially perpendicular to an extending direction of the sensing diaphragm; and the hall effect sensor of each of the first signal pair and the second signal pair is spaced from a corresponding magnet in a radial direction of the sensing diaphragm.

12. The robot of claim 11, wherein the axial force sensor further comprises a holding structure, the inner ring defines a center hole, and the holding structure comprises:

a center shaft passing through the center hole and coupled to the inner ring; and a supporting plate connected to the center shaft and extending parallel to the sensing diaphragm.

13. The robot of claim 12, wherein the axial force sensor further comprises:

a shielding structure installed on the supporting plate and located corresponding to the at least two signal pairs in a circumferential direction of the sensing diaphragm, wherein the shielding structure encloses the at least two signal pairs to protect the at least two signal pairs from signal disturbing; and a hard stop installed on the supporting plate and enclosing the outer ring, wherein there exist clearances between the hard stop and the outer ring on both upper and lower sides, and the hard stop is configured to prevent over deflection of the outer ring.

14. An axial force sensor, comprising:

a sensing diaphragm comprising:
  an inner ring defining a center hole;
  an outer ring; and
  a connecting element connected between the inner ring and the outer ring, wherein the connecting element is more compliant in a direction of the axial force to be detected than in other loading directions;

a holding structure comprising:
  a center shaft passing through the center hole and coupled to the inner ring; and
  a supporting plate connected to the center shaft and extending parallel to the sensing diaphragm; and at least two signal pairs, each of the at least two signal pairs comprising:
  a signal emitter coupled to one of the inner ring and the outer ring; and
  a signal receiver coupled to the other of the inner ring and the outer ring.

15. The axial force sensor of claim 14, wherein the at least two signal pairs comprises a first signal pair and a second signal pair, and the first signal pair and the second signal pair are oppositely arranged along a circumferential direction of the sensing diaphragm.

16. The axial force sensor of claim 15, wherein the signal emitter is a magnet and the signal receiver is a hall effect sensor.

17. The axial force sensor of claim 16, wherein a magnetization direction of the magnet of the first signal pair is opposite to a magnetization direction of the magnet of the second signal pair;

both the magnetization direction of the magnet of the first signal pair and the magnetization direction of the magnet of the second signal pair are substantially perpendicular to an extending direction of the sensing diaphragm; and the hall effect sensor of each of the first signal pair and the second signal pair is spaced from a corresponding magnet in a radial direction of the sensing diaphragm.

18. The axial force sensor of claim 14, further comprising:

a shielding structure installed on the supporting plate and located corresponding to the at least two signal pairs in a circumferential direction of the sensing diaphragm, wherein the shielding structure encloses the at least two signal pairs to protect the at least two signal pairs from signal disturbing.

19. The axial force sensor of claim 14, further comprising:

a hard stop installed on the supporting plate and enclosing the outer ring, wherein there exist clearances between the hard stop and the outer ring on both upper and lower sides, and the hard stop is configured to prevent over deflection of the outer ring.

20. The axial force sensor of claim 14, wherein the signal emitter is installed on the outer ring while the signal receiver is installed on the supporting plate and aligned with the signal emitter in either an axial direction or a radial direction of the sensing diaphragm.

21. The axial force sensor of claim 14, wherein the signal receiver is installed on the outer ring while the signal emitter is installed on the supporting plate and aligned with the signal receiver in either an axial direction or a radial direction of the sensing diaphragm.

22. A robot gripper comprising a catching mechanism and an axial force sensor, the axial force sensor being configured to measure a force acting on the catching mechanism, wherein the axial force sensor comprises:

a sensing diaphragm comprising:
  an inner ring;
  an outer ring; and
  a connecting element connected between the inner ring and the outer ring, wherein the connecting element is more compliant in a direction of the axial force to be detected than in other loading directions;

a holding structure comprising:
  a center shaft passing through the center hole and coupled to the inner ring; and
  a supporting plate connected to the center shaft and extending parallel to the sensing diaphragm; and at least two signal pairs, each of the at least two signal pairs comprising:
  a signal emitter coupled to one of the inner ring and the outer ring; and
  a signal receiver coupled to the other of the inner ring and the outer ring.

23. The robot gripper of claim 22, wherein the at least two signal pairs comprises a first signal pair and a second signal pair, and the first signal pair and the second signal pair are oppositely arranged along a circumferential direction of the sensing diaphragm.

24. The robot gripper of claim 23, wherein the signal emitter is a magnet and the signal receiver is a hall effect sensor, a magnetization direction of the magnet of the first signal pair is opposite to a magnetization direction of the magnet of the second signal pair, both the magnetization direction of the magnet of the first signal pair and the magnetization direction of the magnet of the second signal pair are substantially perpendicular to an extending direction of the sensing diaphragm, and the hall effect sensor of each of the first signal pair and the second signal pair is spaced from a corresponding magnet in a radial direction of the sensing diaphragm.

25. The robot gripper of claim 22, wherein the axial force sensor further comprises:

a shielding structure installed on the supporting plate and located corresponding to the at least two signal pairs in a circumferential direction of the sensing diaphragm, wherein the shielding structure encloses the at least two signal pairs to protect the at least two signal pairs from signal disturbing.

26. The robot gripper of claim 22, wherein the axial force sensor further comprises:

a hard stop installed on the supporting plate and enclosing the outer ring, wherein there exist clearances between the hard stop and the outer ring on both upper and lower sides, and the hard stop is configured to prevent over deflection of the outer ring.

27. A robot with at least one axial force sensor, each of the at least one axial force sensor comprising:

a sensing diaphragm comprising:
an inner ring;
an outer ring; and
a connecting element connected between the inner ring and the outer ring,
wherein the connecting element is more compliant in a direction of the axial force to be detected than in other loading directions;

a holding structure comprising:
a center shaft passing through the center hole and coupled to the inner ring; and
a supporting plate connected to the center shaft and extending parallel to the sensing diaphragm; and at least two signal pairs, each of the at least two signal pairs comprising:

a signal emitter coupled to one of the inner ring and the outer ring; and
a signal receiver coupled to the other of the inner ring and the outer ring.

28. The robot of claim 27, wherein the at least two signal pairs comprises a first signal pair and a second signal pair, and the first signal pair and the second signal pair are oppositely arranged along a circumferential direction of the sensing diaphragm.

29. The robot of claim 28, wherein the signal emitter is a magnet and the signal receiver is a hall effect sensor, a magnetization direction of the magnet of the first signal pair is opposite to a magnetization direction of the magnet of the second signal pair, both the magnetization direction of the magnet of the first signal pair and the magnetization direction of the magnet of the second signal pair are substantially perpendicular to an extending direction of the sensing diaphragm, and the hall effect sensor of each of the first signal pair and the second signal pair is spaced from a corresponding magnet in a radial direction of the sensing diaphragm.

30. The robot of claim 27, wherein the axial force sensor further comprises:

a shielding structure installed on the supporting plate and located corresponding to the at least two signal pairs in a circumferential direction of the sensing diaphragm, wherein the shielding structure encloses the at least two signal pairs to protect the at least two signal pairs from signal disturbing; and a hard stop installed on the supporting plate and enclosing the outer ring, wherein there exist clearances between the hard stop and the outer ring on both upper and lower sides, and the hard stop is configured to prevent over deflection of the outer ring.

* * * * *